US010120779B1

(12) United States Patent
Leung et al.

(10) Patent No.: US 10,120,779 B1
(45) Date of Patent: Nov. 6, 2018

(54) DEBUGGING OF HOSTED COMPUTER PROGRAMS

(71) Applicant: Amazon Technologies, Inc., Seattle, WA (US)

(72) Inventors: Hok Peng Leung, Redmond, WA (US); Antonio Vargas Garcia, Redmond, WA (US); Geoffrey Scott Pare, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 35 days.

(21) Appl. No.: 15/345,700

(22) Filed: Nov. 8, 2016

(51) Int. Cl.
  *G06F 9/44* (2018.01)
  *G06F 11/36* (2006.01)

(52) U.S. Cl.
  CPC ........ *G06F 11/362* (2013.01); *G06F 11/3612* (2013.01)

(58) Field of Classification Search
  CPC .................... G06F 11/3466; G06F 11/3688
  USPC .......................................... 717/127, 124, 129
  See application file for complete search history.

(56) References Cited

U.S. PATENT DOCUMENTS

| | | | | |
|---|---|---|---|---|
| 5,819,093 A * | 10/1998 | Davidson | .............. | G06F 11/362 717/126 |
| 6,516,408 B1 * | 2/2003 | Abiko | ....................... | G06F 5/01 712/227 |
| 6,754,891 B1 * | 6/2004 | Snyder | ................ | G06F 11/3636 714/35 |
| 9,703,678 B2 * | 7/2017 | Stall | .................... | G06F 11/3664 |
| 2007/0168979 A1 * | 7/2007 | Kumar | ................ | G06F 11/3644 717/124 |
| 2014/0173565 A1 * | 6/2014 | Scholl | ................. | G06F 11/3664 717/124 |
| 2015/0135165 A1 * | 5/2015 | Simernitski | ......... | G06F 11/3664 717/124 |
| 2015/0161023 A1 * | 6/2015 | Bragstad | ............... | G06F 11/362 717/129 |

\* cited by examiner

*Primary Examiner* — Phillip H Nguyen
(74) *Attorney, Agent, or Firm* — Baker & Hostetler LLP

(57) ABSTRACT

Techniques for debugging of hosted computer programs are described herein. Execution of a set of instances of a computer program may be hosted by a service on behalf of a developer. The developer may indicate one or more error conditions and an amount of program instances to be monitored for the error conditions. The error conditions may include breakpoints, processing conditions, memory conditions, network packet conditions, and others. A subset of the program instances may be monitored for an error conditions. An error condition may then be detected at a first program instance. A notification of the occurrence of the error condition may be provided to the developer along with information for connecting to the first program instance. The developer may connect to and debug the first program instance, and may also access information such as a memory dump, performance logs, network packet information, and more.

20 Claims, 9 Drawing Sheets

DEBUGGING OF HOSTED COMPUTER PROGRAMS

BACKGROUND

The detection and debugging of error conditions is an important aspect of computer program execution. In some examples, program developers may be customers of a computing service provider that hosts execution of a program on behalf of the developer. This arrangement may often provide a great convenience to developers, for example by allowing them to deploy and execute their programs without having to build, maintain and manage their own program execution infrastructure. Computing service providers and other program execution infrastructures may sometimes allow execution of large scale program fleets including large quantities of program instances.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
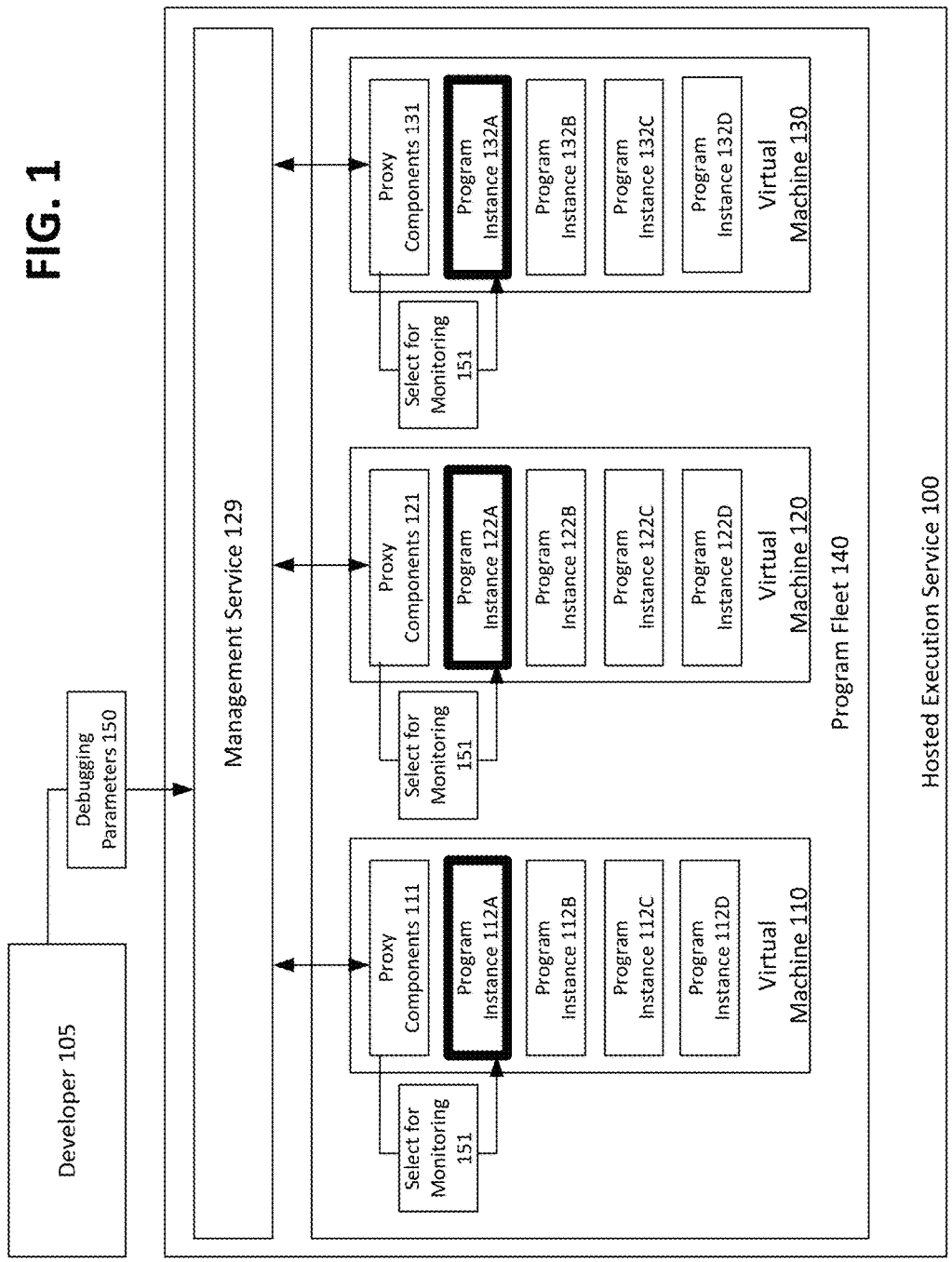
FIG. 1 is a diagram illustrating an example system for debugging of hosted computer programs that may be used in accordance with the present disclosure.

Techniques for debugging of hosted computer programs are described herein. In some examples, execution of multiple instances of a computer program (referred to hereinafter as program instances) may be hosted, for example by a computing service provider that operates one or more data centers or other collections of server compute nodes. In some cases, a developer of the computer program may be a customer of the computing service provider and may pay a fee for having the computer program hosted by the computing service provider. In one embodiment, the computing service provider may host execution of large scale program fleets including large quantities of program instances. Additionally, in one embodiment, the program developer may not have direct control over, or access to, the underlying program instances. For example, the developer may not directly perform operations such as launching individual program instances, and the developer may be unable to directly connect to individual program instances without first receiving information (e.g., Internet Protocol (IP) address, port number, etc.) and assistance (e.g., opening of a firewall, etc.) from the host.

In some cases, to enable debugging in these and other scenarios, a developer may provide a number of debugging parameters to the host service. In some examples, the debugging parameters may include an indication of one or more error conditions for which to monitor the computer program. The error conditions may include conditions such as breakpoints, processing conditions (e.g., exceeding a threshold usage of processing resources), memory conditions (e.g., exceeding a threshold usage of memory resources, detecting a defective memory state), network packet conditions (e.g., communicating with a suspicious address), and other conditions. The debugging parameters may also include other information, such as a selection of debugging components to attach to the program instances and, in some cases, custom (e.g., program-specific) administrative instructions that the developer may provide for responding to a detected error condition.

Also, in some examples, the debugging parameters may include an indication of an amount of program instances to monitor for the error conditions. In particular, in some cases, it may not be advantageous to monitor all hosted instances of the computer program, as this may negatively impact large amounts of users and may also raise the cost and complexity of the debugging process. Thus, in some cases, a developer may indicate an amount of program instances to monitor, such as a total quantity of program instances or a percentage of all hosted program instances. Also, in some cases, the developer may request that monitoring be performed up until a specified quantity of error condition occurrences is detected.

Upon receiving the debugging parameters, the host service may then select, from the total set of hosted program instances, a subset of program instances that are to be monitored for debugging. In some examples, the host service may attach one or more selected debugging components to the subset of program instances, may set breakpoints for the subset of program instances, and perform other operations in accordance with the provided debugging parameters. The host service may then monitor the subset of program instances in order to detect occurrences of the error conditions. Eventually, the host service may detect the occurrence of an error condition, for example on a first program instance.

Upon detection of the error condition, the host service may then perform one or more corrective actions in response to the error condition. For example, the host service may stop execution of the first program instance, stop execution of other program instances executing on the same virtual machine as the first program instance, perform a memory dump for the first program instance, collect performance logs associated with the first program instance, collect network packet information associated with the first program instance, and/or perform any custom administrative instructions that may have been included by the developer in the debugging parameters.

The host service may also perform a number of other operations in response to the detected error condition. For example, the host service may notify the developer of the error condition, provide the developer with access to the memory dump, logs, or other related information, provide the developer with connection information (e.g., IP address, port number, etc.) for the first program instance, and/or open a firewall to the developer for the first program instance. In some cases, the developer may use this information to connect to the first program instances (e.g., connect a debugging client to the first program instance) and debug the program instance.

In some examples, if execution of the first program instance is stopped for debugging, then this may negatively impact users that are connected to the first program instance, for example forcing those users to reconnect to a different program instance and potentially lose unique attributes of the state of the first program instance. In some cases, in order to help improve the user experience, a replica program instance, which is a replica of the first program instance, may be generated. In one embodiment, upon detection of the error condition, the users of the first program instance may be re-assigned to the replica program instance. The users may then continue execution of the computer program on the replica instance without losing the unique attributes of the state of the first program instance, as those unique attributes may be replicated to the replica program instance. Upon re-assignment of the users to the replica program instance, the developer may connect to the first program instance for debugging of the first program instance. As an alternative approach, in some cases, when the error condition is detected on the first program instance, the users of the first program instance may not be re-assigned to the replica instance and may continue to use the first program instance. Instead, the developer may connect to the replica program instance for debugging of the replica program instance.

FIG. 1 is a diagram illustrating an example system for debugging of hosted computer programs that may be used in accordance with the present disclosure. As shown in FIG. 1, a hosted execution service 100 may host execution of a computer program on behalf of a developer 105. As set forth above, in one embodiment, hosted execution service 100 may operate one or more data centers or other collections of server compute nodes. In some cases, developer 105 may be a customer of the hosted execution service 100 and may pay a fee for having the computer program hosted by the hosted execution service 100. It is noted, however, that there is no requirement that developer 105 must be a customer of hosted execution service 100 or must pay a fee to the hosted execution service 100. In some examples, The hosted computer program include any type of executable computer program including, but not limited to, media applications, business and productivity applications, communications applications, data management applications, and many others. In some specific examples, the hosted computer program may be an interactive program, such as a video game or another program with which one or more users may interact.

As also shown in FIG. 1, the hosted computer program includes a set of executing program instances 112A-C, 122A-C, and 132A-C. The executing program instances are executed using three virtual machines 110, 120 and 130, which are included in a program fleet 140 for the hosted computer program. Thus, in the example of FIG. 1, the program fleet 140 includes three virtual machines, which each execute four program instances. It is noted, however, that a computer program in accordance with the disclosed techniques may be hosted using any number of virtual machines or other computing components executing any number of program instances. For example, in some cases, hosted execution service 100 may host execution of large scale program fleets including large quantities of program instances. In some examples, one or more program users (not shown) may connect to each of the program instances 112A-C, 122A-C, and 132A-C. For example, in the scenario in which program instances 112A-C, 122A-C, and 132A-C are instances of a video game, the program users may include video game players that connect to the program instances 112A-C, 122A-C, and 132A-C via hosted execution service 100.

In some examples, developer 105 may indicate to hosted execution service 100 a quantity of program instances for which the developer is willing to pay or that should otherwise be executed by the hosted execution service 100. However, the developer 105 may not have direct control over, or access to, the underlying program instances 112A-C, 122A-C, and 132A-C. For example, the developer 105 may not directly perform operations such as launching of individual program instances 112A-C, 122A-C, and 132A-C. Instead, in some examples, launching of individual program instances may be performed using components internal to hosted execution service 100. For example, in some cases, the hosted execution service 100 may include a management service 129, which may communicate with proxy components 111, 121 and 131 on respective virtual machines 110, 120 and 130. In some cases, management service 129 may provide, to proxy components 111, 121 and 131, an indication of the amount of program instances that are to be executed on their respective virtual machines 110, 120 and 130. The proxy components 111, 121 and 131 may then either launch new program instances (or not re-launch expiring program instances) such that the proper quantity of program instances is eventually achieved. Additionally, in some cases, management service 129 may allocate or de-allocate virtual machines to or from program fleet 140 as necessary in order to achieve the proper quantity of program instances.

Because developer 105 may not have direct access to, or control over, program instances 112A-C, 122A-C, and 132A-C, the developer may be unable to directly configure the program instances for 112A-C, 122A-C, and 132A-C for monitoring and debugging of error conditions. Thus, in some examples, hosted execution service 100 may instead perform these operations on behalf of the developer 105. In particular, developer 105 may provide to hosted execution service 100 a set of debugging parameters 150, which may include parameters selected by the developer 105 for monitoring and debugging of the hosted computer program.

In some examples, the debugging parameters 150 may include an indication of an amount of program instances to monitor for error conditions. In particular, in some cases, it may not be advantageous to monitor all hosted instances of the computer program, as this may negatively impact large amounts of users and may also raise the cost and complexity of the debugging process. Thus, in some cases, a developer may indicate an amount of program instances to monitor, such as a percentage of all hosted program instances. As a specific example, in the case of FIG. 1, the developer 150 has selected twenty-five percent (i.e., one-out-of-four) of the total quantity of hosted program instances to be monitored for error conditions. Based on these instructions, management service 129 may instruct proxy components 111, 121 and 131 to select one-out-of-four program instances on their respective virtual machines 110, 120 and 130 to be monitored for error conditions. As shown by selections 151, proxy components 111 have selected program instance 112A for monitoring, proxy components 121 have selected program instance 122A for monitoring, and proxy components 131 have selected program instance 132A for monitoring. It is noted that the selections 151 are merely examples, and that all virtual machines in the fleet are not required to have the same quantity of program instances be selected for monitoring.

It is also noted that, in addition to a percentage, developer 105 may also indicate a total quantity of program instances to be monitored. For example, the developer may request that five program instances be monitored for error conditions. Management service 129 may then instruct proxy components 11, 121 and 131 to select five program instances, such as by selecting the first five program instances that are launched, selecting five program instances at random, or using other techniques. In yet other examples, the developer may request that monitoring be performed up until a specified quantity of error condition occurrences is detected. For example, the developer may request that one or more program instances be monitored for error conditions up until five error conditions are detected, and then monitoring may be ceased. In some cases, proxy components may report detected error conditions to management service 129, for example in order to maintain a count of the amount error conditions that have been detected at any given time.

Additionally, in some examples, the debugging parameters 150 may include an indication of one or more debugging components, such as debugging servers, to attach to the monitored program instances 112A, 122A and 132A. For example, in some cases, hosted execution service may provide a collection of available debugging components, and the developer 105 may select one or more of the available debugging components to attach to the monitored program instances 112A, 122A and 132A. In some examples, one or more of the available debugging components may be platform-specific (e.g., operating system (OS)-specific) components. Also, in some examples, debugging components may include other components related to the debugging process, such as network monitoring components and other communications monitoring components, performance logging components, memory dump generation components, components that monitor usage of processing, memory, and other resources, components that monitor identity, behavior, and other characteristics of program users, and any number of other components.

Furthermore, in some examples, the debugging parameters 150 may include indications of one or more error conditions for which to monitor the computer program. The error conditions may include conditions such as breakpoints, processing conditions, memory conditions, network packet conditions, and other conditions. For example, in some cases, the error conditions may include processing and/or memory usage thresholds. Processing and/or memory usage, by a program instance, that meets or exceeds these thresholds may trigger an error condition. As another example, the error conditions may include an indication of a defective memory state, such as an invalid location, score, state, or other value. For example, if a character in a video game that cannot swim is moved into a location that corresponds to a body of water, then storing coordinates for that location in association with the character may trigger a defective memory state. As yet another example, in some cases, network packet error conditions may include a detection of a network packet that is received from, and/or sent to, an invalid or suspicious address, such as an address of a suspected hacker or other malicious actor.

In one embodiment, the debugging parameters 150 may also include custom (e.g., program-specific) administrative instructions that the developer may provide for responding to a detected error condition. For example, in some cases, if a particular event in a video game (e.g., firing a weapon, moving to a particular location, attaining a certain score or other accomplishment, etc.) is known to cause defects in the game, then a developer may set a breakpoint corresponding to that event and then use custom instructions to capture (e.g., take snapshots of) certain game-specific data that may be known or suspected of being corrupted based on the occurrence of that event. For example, snapshots may be taken directly before and after the event and/or at other intervals. The taking of a snapshot may include actions such as generating a backup and/or a replica of a virtual machine or other component that executes the game or other program, storing one or more current states of the game or other program (e.g., character locations, user input data, scores, character inventories, elapsed time, etc.), storing associated memory buffers or any portions thereof, storing other information associated with the game or program, such as network packet or other communications logs, connected user information, processing, memory, and other resource usage information, and/or other game or program-related information. It is noted that this is merely one example of custom administrative instructions and that many other different types of custom instructions, for different purposes, may also be employed. It is further noted that, in addition or as an alternative to providing custom instructions in the debugging parameters 150, a developer 105 may also be informed of an error condition and may manually retrieve any desired data from the affected program instance, as will be described in greater detail below.

Figure 2:
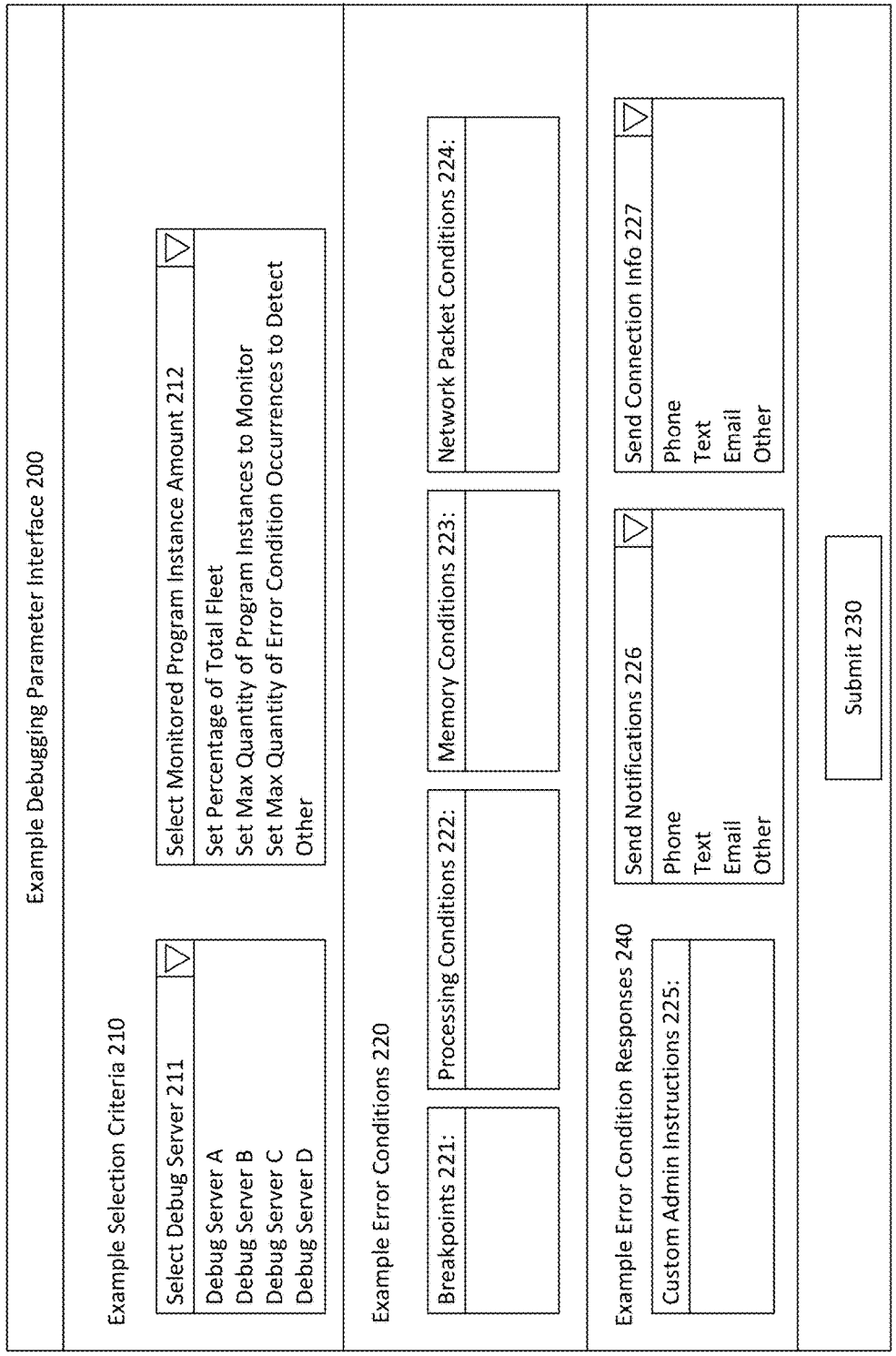
FIG. 2 is a diagram illustrating an example debugging parameter interface that may be used in accordance with the present disclosure.

In one embodiment, the debugging parameters 150 may be provided to host execution service 100 using an interface integrated into a developer console or dashboard application provided by the hosted execution service 100. Referring now to FIG. 2, an example debugging parameter interface 200 will now be described in detail. As shown in FIG. 2, interface 200 includes an example selection criteria section 210, which includes controls for selection of debugging servers, monitored program instances, and other example criteria. Specifically, the select debug server drop down menu 211 allows the developer 105 to select one or more available debugging servers to attach to monitored program instances. As set forth above, the hosted execution service 100 may, in some examples, provide a variety of available debugging servers, which may be filtered based on a particular platform on which the program instances operate or other factors. Additionally, section 210 includes a monitored program instance amount drop down menu 212, which allows the developer 105 to select an amount of program instances that are to be monitored for error conditions. Menu 212 includes options described above, such as setting a percentage of a total fleet (e.g., twenty-five percent as in FIG. 1), setting a maximum quantity of program instances to monitor, setting a maximum quantity of error condition occurrences to detect, and other options. Additionally, interface 200 includes an example error condition section 220, which includes controls for selection of example error conditions for which to monitor. Specifically, Breakpoints input field 221 allows the developer 105 to indicate various breakpoints for the monitored program instances. Processing Conditions input field 222 allows indicating of various processing error conditions (e.g., maximum acceptable processing usage threshold, etc.). Memory Conditions input field 223 allows indicating of various memory error conditions (e.g., maximum acceptable memory usage threshold, defective memory states, etc.). Network Packet Conditions input field 224 allows indicating of various network packet error conditions (e.g., suspicious network packet addresses, etc.). Interface 200 further includes an example error condition responses section 240, which includes controls for selection of various example error condition responses. Specifically, Custom Admin Instructions input field 225 allows the developer 105 to specify various custom administrative instructions, such as those described above. Send notifications drop down menu 226 allows the developer to select one or more different mediums (e.g., phone, text, email, other) for receiving notifications of an occurrence of an error condition as will be described in greater detail below. In addition to notifying the developer about the error condition, the error condition may also be logged, for example in a collection of information associated with the error condition as described below. Send connection information drop down menu 227 allows the developer to select one or more different mediums (e.g., phone, text, email, other) for receiving connection information for connecting to a program instance on which an error condition is detected as will be described in greater detail below. Submit button 230 may be selected to submit the parameters indicated via interface 200.

Thus, as set forth above, debugging parameters 150 may be provided by developer 105 in order to control program instance monitoring by hosted execution service 100. Referring back to FIG. 1, it is seen that the debugging parameters 150 may be received by management service 129, which may, in turn, communicate all, or any portions of, the debugging parameters 150 to proxy components 111, 121 and 131. It is noted that, in some examples, the debugging parameters 150 may be changed or updated by the developer 105 at any time, and these changes may also be communicated by management service 129 to proxy components 111, 121 and 131.

Figure 3:
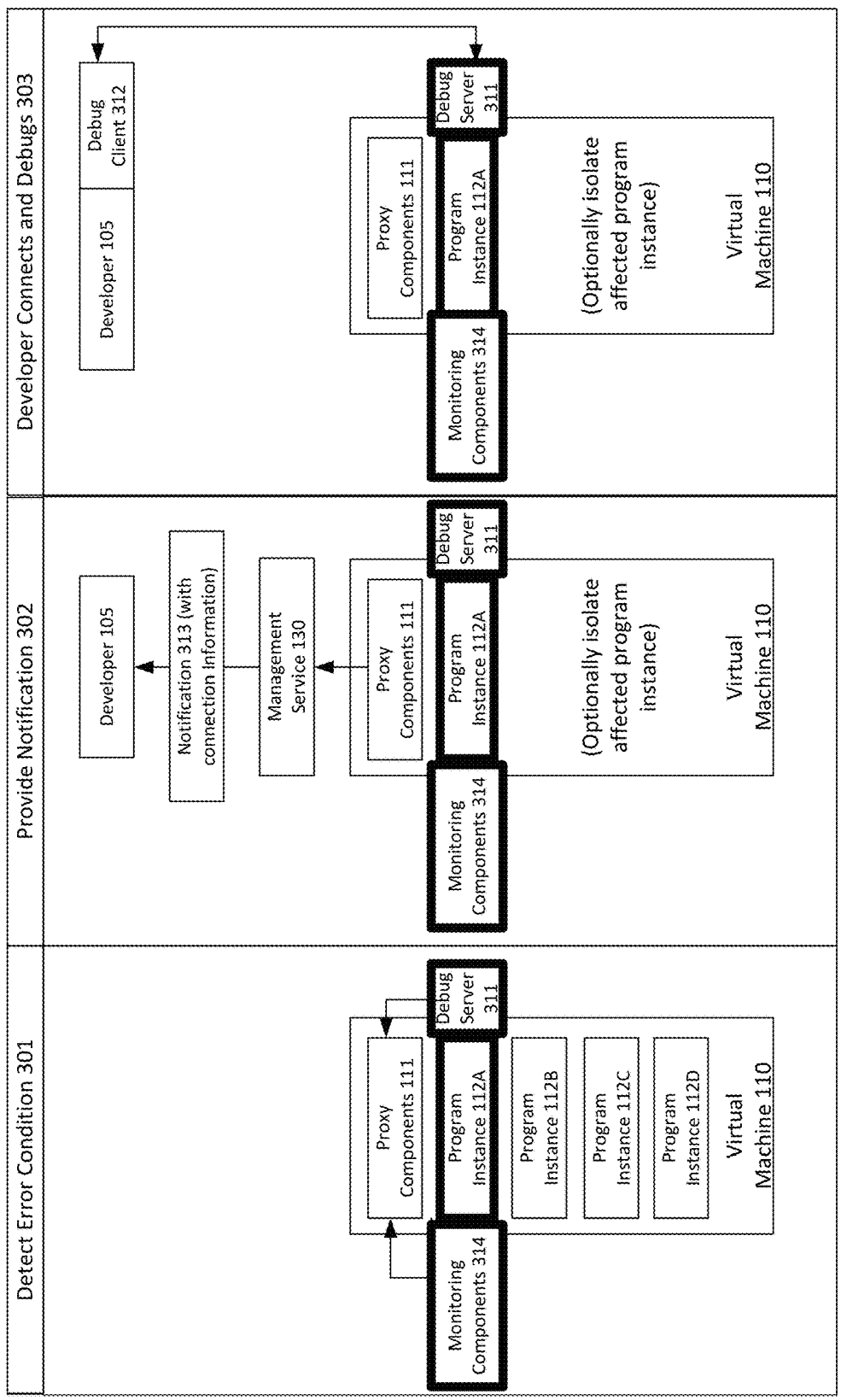
FIG. 3 is a diagram illustrating example stages of error condition detection and response that may be used in accordance with the present disclosure.

Referring now to FIG. 3, some example stages of error condition detection and response will now be described in detail. In particular, in the example of FIG. 3, virtual machine 110 executes four program instances 112A-D, one of which (program instance 112A) is selected by proxy components 111 for monitoring. As shown in FIG. 3, proxy components 111 have connected a debug server 311 to the monitored program instance 112A. As described above, debug server 311 may be selected by developer 105 from a number of available debugging servers provided by the hosted execution service 100. In some examples, upon launching of the monitored program instance 112A, proxy components 111 may connect debug server 311 to monitored program instance 112A and may also perform other error condition-related operations, such as setting selected breakpoints on the monitored program instance 112A. Additionally, proxy components 111 may also optionally connect one or more monitoring components 314 to program instance 112A for monitoring of certain error conditions. For example, monitoring components 314 may include network packet monitoring components to monitor for certain network packet error conditions. Upon launching of the monitored program instance 112A, it may be monitored by debug server 311, proxy components 111 (and/or optionally other connected monitoring components 314) to detect the occurrence of an error condition. In some examples, the occurrence of an error condition, such as certain breakpoints, defective memory states, certain network packet conditions, processing conditions, and memory conditions may be reported by the program instance 112A and/or detected by debug server 311, proxy components 111 and/or monitoring components 314. For example, in some cases, debug server 311 may detect the occurrence of one or more breakpoints. Also, in some cases, proxy components 111 may receive periodic updates from program instance 112A regarding processing and/or memory usage by the program instance 112A. Proxy components 111 may then compare this processing and/or memory against processing and/or memory usage thresholds indicated in the debugging parameters 150. An error condition may be detected when processing usage by program instance 112A meets or exceeds a processing usage threshold, or when memory usage by program instance 112A meets or exceeds a memory usage threshold. Also, in some examples, monitoring components 314 may compare addresses of network packets sent and/or received by program instance 112A to suspicious or untrusted network packet addresses, and an error condition may be detected when the comparison results in a correlation or match.

As shown in FIG. 3, at stage 301, an error condition is detected, for example based on any of the above described or other error condition detection techniques. At stage 302, upon detection of the error condition, a notification 313 of the detected error condition is provided to the developer 105. In one embodiment, the notification 313 may be provided by management service 129 based on information reported by proxy components 111. The notification 313 may be sent via any combination of phone, email, text, or any other desired communications techniques. In the example of FIG. 3, the notification 313 includes connection information that allows the developer 105 to connect to program instance 112A. This connection information may include, for example, an IP address and a port number for program instance 112A. As set forth above, because the developer 105 may not directly launch program instances, this connection information may not be readily accessible to the developer 105 if not provided by hosted execution service 100. In addition to the connection information, notification 313 may also include a brief description or identification of the error condition, as well as links to one or more interfaces or locations for obtaining more detailed information associated with the error condition, which will be described in greater detail below.

As also shown in FIG. 3, in one embodiment, upon detecting an error condition for program instance 112A, the program instance 112A may be isolated. In some examples, isolation of the program instance 112A may include terminating other program instances 112B-D executing on the same virtual machine 110 as program instance 112A. In some cases, termination of these other program instances 112B-D may be advantageous because they may communicate and share resources with program instance 112A, and there may be concern that the error condition of program instance 112A and/or the debugging of program instance 112A may negatively impact the other program instances 112B-D. Also, in some examples, isolation of the program instance 112A may include at least temporarily prohibiting new processes and/or program instances from being launched on the virtual machine 110.

At stage 303, the developer 105 may use the connection information included in notification 313 to connect to, and debug, program instance 112A. In particular, in one embodiment, the developer may use an IP address and port number to connect a debug client 312 to the debug server 311. In some cases, hosted execution service 100 may open a firewall and/or other security barriers in order to allow developer 105 to connect to program instance 112A. In one embodiment, debug client 312 may include one or more plug-in components, for example that may be specialized for interacting with the hosted execution service. For example, such plug-ins may be specialized to receive error detection notifications and connection information from the hosted execution service 100 and to, in some cases automatically, establish a connection between the debug client 312 and the debug server 311.

Figure 4:
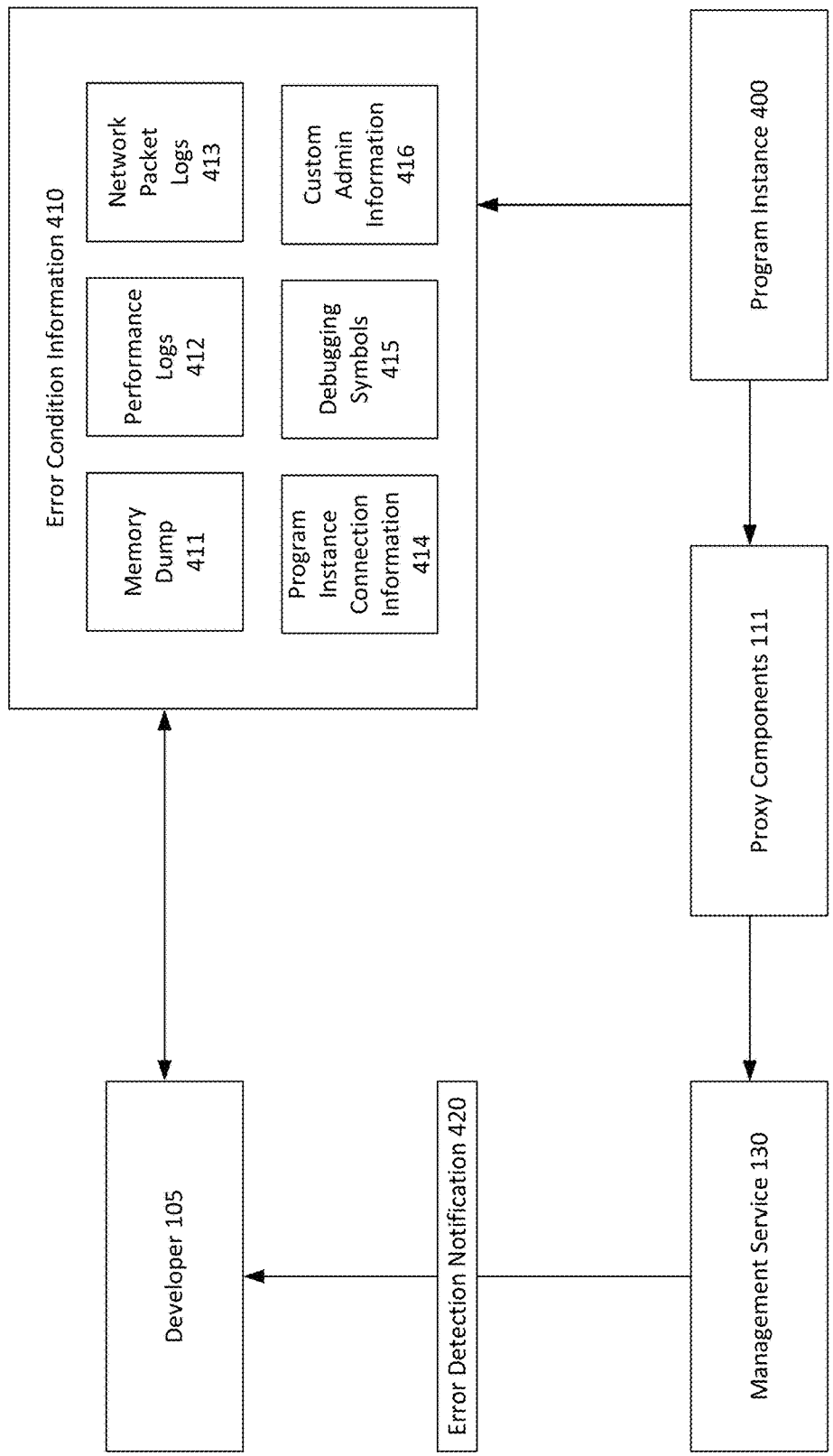
FIG. 4 is a diagram illustrating example error condition information that may be used in accordance with the present disclosure.

In some examples, in addition or as an alternative to connecting to the program instance 112A, the developer 105 may access various types of information associated with the detected error condition. Referring now to FIG. 4, some example error condition information 410 that may be made available to developer 105 will now be described in detail. In the example of FIG. 4, an error condition may be detected at a program instance 400, and an error detection notification 420 of this error condition may be sent to developer 105 via proxy components 111, management service 129, and/or other components. As set forth above, in some examples, upon receiving notification 420, the developer 105 may connect to the program instance 400 to debug the program instance 400. Additionally, in the example of FIG. 4, developer 105 may retrieve error condition information 410 associated with the detected error condition. As set forth above, in one embodiment, notification 420 may include links to one or more interfaces or locations for obtaining error condition information 410. Also, in one embodiment, error condition information 410, or any portions thereof, may be available via one or more developer interfaces, consoles, and/or dashboards provided by hosted execution service 100. In one embodiment, error condition information 410, or any portions thereof, may be stored in a searchable information storage, for example that may be organized and searched according to various attributes, including, but not limited to, a developer name or identifier, a program name or identifier, a program instance identifier, time, date, location, user (e.g., game player) names or identifiers, and many other attributes. Also, in one embodiment, the detected error condition itself may be provided with an identifier that may be used to search for information associated therewith, and this identifier may be provided to the developer 105, for example via notification 420.

In the example of FIG. 4, error condition information 410 includes a memory dump 411, such as a crash dump, which may, for example, be obtained from program instance 400 upon detection of the error condition. Error condition information 410 further includes performance logs 412, which may also, for example, be obtained from program instance 400 upon detection of the error condition. Error condition information 410 further includes network packet logs 413. In one embodiment, network packet logs 413 may be collected for one or more time periods relative to the detection of the error condition, such as particular time periods preceding and following the detection of the error condition. In some cases, these network packet logs 413 may be used to determine whether messages have been sent to, or received from, a suspicious address in close time proximity to the occurrence of the error condition, which may potentially indicate that this address may be somehow involved with the error condition. In one embodiment, network packet information may be continually logged throughout program execution, such that it is available on-demand when needed. To reduce storage requirements, the network packet information may also be flushed and deleted after expiration of a specified time period. Error condition information 410 may also include program instance connection information 414 for connecting to the affected program instance such as described above. Program instance connection information 414 may also be included in notification 420. Error condition information 410 further includes debugging symbols 415, such as information that associates programming-language constructs with corresponding portions of program code. In one embodiment, the debugging symbols 415 may be used by the developer 105 as part of the process of debugging program instance 400.

Additionally, error condition information 410 includes custom administrative information 416, which may include any information obtained as a result of one or more custom (e.g., program-specific) administrative instructions provided by the developer, for example via debugging parameters 150 of FIG. 1. As set forth, in some cases, if a particular event in a video game (e.g., firing a weapon, moving to a particular location, attaining a certain score or other accomplishment, etc.) is known to cause defects in the game, then a developer may set a breakpoint corresponding to that event and then use custom instructions to capture (e.g., take snapshots of) certain game-specific data that may be known or suspected of being corrupted based on the occurrence of that event. For example, snapshots may be taken directly before and after the event and/or at other intervals. In some examples, custom administrative information 416 may include these or other data snapshots or other collected data or information. In some examples, custom administrative instructions may be stored by, or otherwise accessible to, proxy components 111 and may be executed by proxy components 111 upon detection of breakpoint or other triggering condition. In some examples, in addition or as an alternative to custom administrative instructions, the developer may manually retrieve any desired data from program instance 400, for example by connecting to program instance 400 and/or an attached debugging server as described in detail above.

It is noted that error condition information 410 of FIG. 4 merely includes non-limiting examples of certain types of error condition information and many other types of error condition information may also be employed. Thus, as described above, when an error condition is detected, in addition to accessing error condition information 410, a developer may connect to a program instance in order to debug the program instance. In some examples, collection of error condition information 410 and/or debugging of the program instance may negatively impact the experience of users (e.g., players of a video game) that are connected to the program instance, for example by requiring that the users disconnect from the program instance, reducing the performance of the program instance, and/or requiring that execution of the program instance be at least temporarily stopped. In some cases, this may force users to reconnect to a different program instance and potentially lose unique attributes of the state of the first program instance. For example, for a video game, if the video game instance is stopped for debugging and players are disconnected, then the players may sometimes lose certain aspects of the game state, such as certain buildings or structures that have been constructed in the game, aspects of certain battles or events that have occurred or are occurring in the game, and the like.

Figure 5:
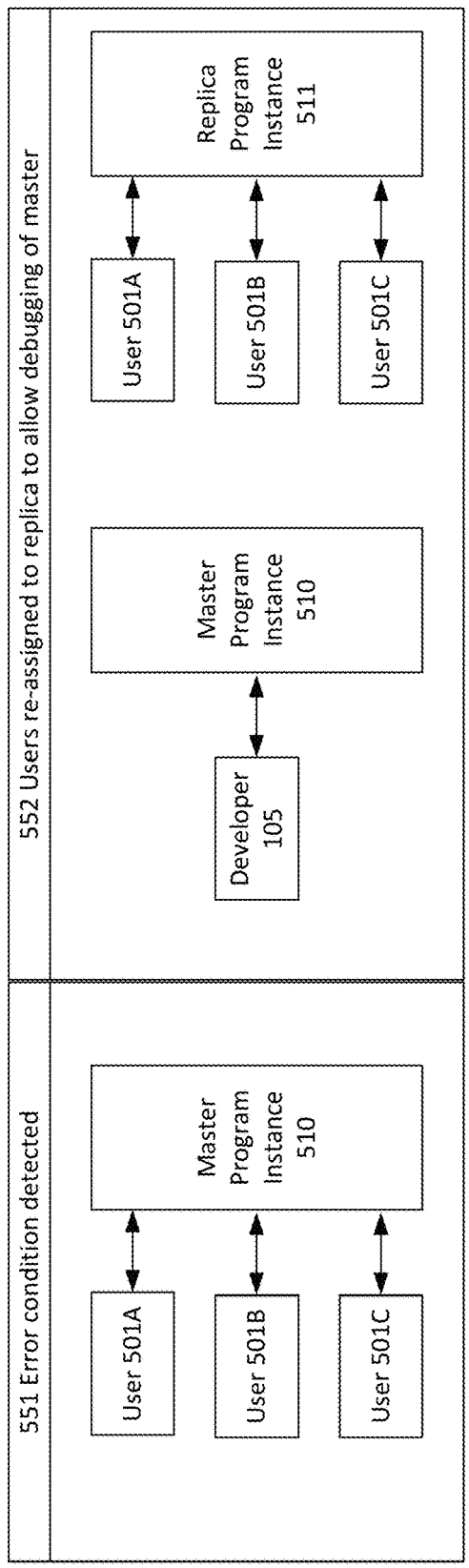
FIG. 5 is a diagram illustrating a first example use case for program instance replication and debugging that may be used in accordance with the present disclosure.
Figure 6:
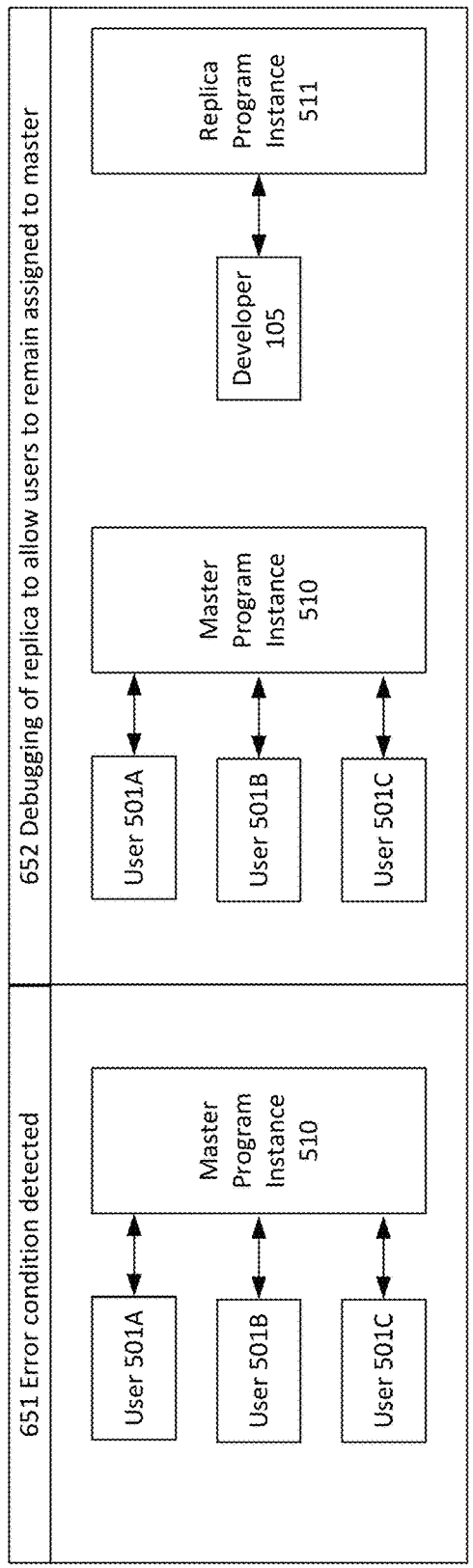
FIG. 6 is a diagram illustrating a second example use case for program instance replication and debugging that may be used in accordance with the present disclosure.

For the above described and other reasons, it may sometimes be advantageous to generate a replica program instance that is a replica of the master program instance to which the users are actually connected. Referring now to FIGS. 5 and 6, some example use cases for a replica program instance will now be described in detail. In particular, a first example use case, including stages 551 and 552, is depicted in FIG. 5. As shown, in stage 551, users 501A-C are connected to a master program instance 510. For example, in some cases, master program instance 510 may be a video game, and users 501A-C may be players of the video game. At stage 551, an error condition is detected in association with master program instance 510, such as any of the example error conditions described in detail above. As shown, in stage 552, a replica program instance 511 is generated that is a replica of master program instance 510. Replica program instance 511 may be, for example, a program instance that includes or accesses state information and/or other program-instance-specific from master program instance 510.

In one embodiment, replica program instance 511 may be generated in response to detection of the error condition at stage 551. For example, in some cases, replica program instance 511 may be generated by temporarily stopping execution of master program instance 510, performing a live memory dump from master program instance 510, and copying or replicating memory offsets and other memory data from master program instance 510 to the replica program instance 511. Also, in one embodiment, replica program instance may be generated by taking a snapshot of a virtual machine on which the master program instance 510 executes and then copying this snapshot to another virtual machine.

Furthermore, in one embodiment, replica program instance 511 may be generated prior to detection of the error condition at stage 551, such that the replica program instance may be already generated and available on-demand upon detection of the error condition at stage 551. For example, in some cases, replica program instance 511 may be launched simultaneously with master program instance 510 and may periodically receive state information and other program-instance-specific information from master program instance 510 throughout its course of execution, such as to replicate this information and remain synchronized or nearly synchronized with master program instance 510.

As shown in stage 552, subsequent to detection of the error condition at stage 551, users 501A-C may be migrated (e.g., re-assigned) from master program instance 510 to replica program instance 511. Specifically, the users 501A-C may be disconnected from master program instance 510, provided with connection information (e.g., IP address and port number) for replica program instance 511, and may then connect to replica program instance 511 using the provided connection information. In some examples, prior to, or in close time proximity to, migrating the users 501A-C to the replica program instance 511, the replica program instance 511 may be instantiated with the current state of the master program instance 510 and configured accordingly. For example, for a video game, this may include configuring the replica program instance 511 such that character locations, character inventories, scores, and other game states correspond to game states retrieved from the master program instance 510. The migration of users 501A-C allows developer 105 to connect to and debug the master program instance 510 without substantially negatively impacting the experiences of users 501A-C. In particular, upon connecting to replica program instance 511, the users 501A-C may continue to interact and participate in their collective program experience, in some cases maintaining an identical or nearly identical program state from master program instance 510.

A second example use case for replication of a program instance is depicted in FIG. 6. In particular, FIG. 6 depicts a first stage 651, which is identical to stage 551 from prior FIG. 5. In particular, users 501A-C are connected to master program instance 510, and an error condition is detected at master program instance 510. However, subsequent stage 652 is different from stage 552 of prior FIG. 5. In particular, instead of migrating users 501A-C to replica program instance 511, the users 501A-C remain connected to master program instance 510 and continue to interact with the master program instance 510. Rather than migrating users 501A-C, the developer 105 instead connects to replica program instance 511 in order to debug the replica program instance 511. Debugging of the replica program instance 511 may, in some cases, provide the same or nearly the same results as debugging of the master program instance 510, without requiring migration of the user 501A-C. In some examples, rather than being provided connection information (e.g., IP address and port number) for the master program instance 510, the developer 105 may additionally or alternatively be provided with connection information for the replica program instance 511 and may use this information to connect to the replica program instance 511 for debugging.

Figure 7:
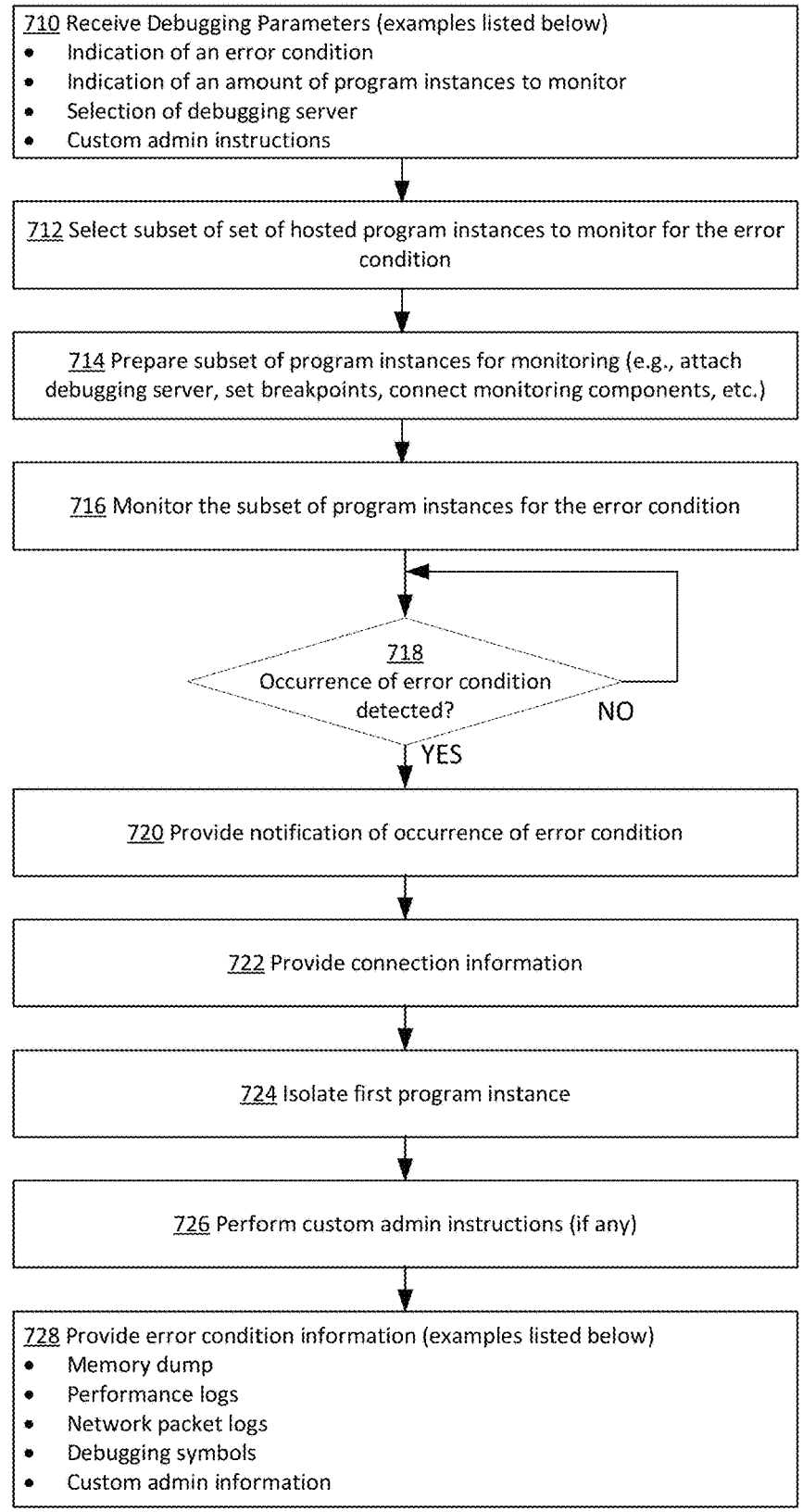
FIG. 7 is a flowchart illustrating an example process for enabling debugging of a hosted computer program that may be used in accordance with the present disclosure.

FIG. 7 is a flowchart illustrating an example process for enabling debugging of a hosted computer program that may be used in accordance with the present disclosure. The process of FIG. 7 is initiated at operation 710, at which debugging parameters are received, for example by a host service from a program developer. In some examples, the debugging parameters may include an indication of an error condition for which to monitor the hosted computer program. The error condition may include, for example, a breakpoint, a processing condition, a memory condition, a network packet condition, and/or other error conditions. The debugging parameters may also include an indication of an amount of program instances that are to be monitored for the error condition, such as a percentage of a set of program instances of the computer program that are executed by the host service, a quantity of program instances to monitor for the error condition, and/or a quantity of occurrences of the error condition to detect. The debugging parameters may also include an indication of a debugging server to attach to the monitored program instances, such as a selection of one or a group of available debugging servers provided by the host service. Also, in some examples, the debugging parameters may include an indication of custom (e.g., program-specific) administrative instructions, for example to be executed upon detection of the error condition, such as to retrieve values of variables and/or snapshots of various portions of program data.

At operation 712, a subset of the set of hosted program instances is selected to monitor for the error conditions. In some examples, the subset may be selected based, at least in part, on an indication of an amount of program instances to be monitored for the error condition, such as may be included in the debugging parameters as described above. For example, if a developer selects to monitor twenty-five percent of the program fleet, then the host service may select a subset of twenty-five percent of the program fleet for monitoring. In the example of FIG. 1, the host service has selected a subset of the program fleet 140 including program instances 112A, 122A and 132A, which includes twenty-five percent of the program instances in the total program fleet 140. In one embodiment, the subset may be selected based on communication between management service 129 and proxy components 111, 121 and 131 as described in detail above.

At operation 714, the subset of program instances may be prepared for monitoring. In one embodiment, this may include attaching a debugging server and/or debugging computer to the each of the subset of program instances, such as a debugging server selected by the developer via the debugging parameters as described above. Also, in one embodiment, operation 714 may include setting breakpoints on each of the subset of program instances, such as breakpoints selected by the developer via the debugging parameters as described above. Furthermore, in one embodiment, operation 714 may include connecting one or more monitoring components to each of the subset of program instances, such as a network packet monitoring component or other monitoring components described above.

At operation 716, the subset of program instances may be monitored to detect the error condition, such as by debug server 311 of FIG. 3, proxy components 111, 121 and 131 of FIG. 1 and/or by one or more other connected monitoring components. In some examples, the subset of program instances may be monitored by periodically collecting and/ or receiving information about various parameters of the program instances (e.g., processing usage, memory usage, memory states, variable values, network communications, etc.) and comparing values of these parameters to error conditions identified in the debugging parameters. At operation 718, it is determined whether an occurrence of the error condition is detected, for example in association with a first program instance of the subset of program instances. As set forth above, in some examples, an error condition may be detected when a program instance attains a defective memory state or variable value, meets or exceeds a threshold processing and/or memory usage value, communicates with a suspicious or untrusted user or address, or based on other conditions.

When an occurrence of the error condition is detected, for example in association with a first program instance of the subset of program instances, the process may proceed to operation 720, at which a notification is provided, for example to a developer, of the occurrence of the error condition. As set forth above, in some examples, the notification may be sent via any combination of phone, email, text, or any other desired communications techniques. The notification may include a brief description or identification of the error condition, as well as links to one or more interfaces or locations for obtaining more detailed information associated with the occurrence of the error condition, which will be described in greater detail below.

At operation 722, connection information is provided. In particular, in some examples, the connection information may include information for connecting to the first program instance, such as an IP address and port number for the first program instance, for debugging of the first program instance. Also, in one embodiment, a replica of the first program instance may be generated (e.g., as shown in FIG. 6), and the connection information may include information for connecting to the replica program instance, such as an IP address and port number for the replica program instance, for debugging of the replica program instance. Thus, the provided connection information may include information for connecting to the first program instance, to a replica program instance, or both. Additionally, at operation 722, the host service may open its firewall for the first program instance (and/or its replica) to allow the developer to connect to the first program instance (and/or its replica).

At operation 724, the first program instance (and/or its replica) may be isolated. As set forth above, in some examples, isolation of the first program instance may include termination of other program instances executing on the same virtual machine as the first program instance. In some cases, termination of these other program instances may be advantageous because they may communicate and share resources with the first program instance. The error condition of the first program instance and/or the debugging of the first program instance may negatively impact the other program instances. Also, in some examples, isolation of the first program instance may include at least temporarily prohibiting new processes and/or program instances from being launched on the virtual machine that executes the first program instance.

At operation 726, custom administrative instructions may optionally be performed, for example at the first program instance. As set forth above, custom (e.g., program-specific) administrative instructions may sometimes be provided by a developer, such as to be executed in response to a detected error condition. As set forth, in some cases, if a particular event in a video game (e.g., firing a weapon, moving to a particular location, attaining a certain score or other accomplishment, etc.) is known to cause defects in the game, then a developer may set a breakpoint corresponding to that event and then use custom instructions to capture (e.g., take snapshots of) certain game-specific data (e.g., variable values) that may be known or suspected of being corrupted based on the occurrence of that event. For example, snapshots may be taken directly before and after the event and/or at other intervals.

At operation 728, information associated with the occurrence of the error condition, also referred to as error condition information, is provided. The error condition information may include, for example, memory dump information, performance log information, network packet information, custom administrative information (e.g., information collected from execution of custom administrative instructions), debugging symbols, and/or other information. As set forth above, in one embodiment, the notification of the occurrence of the error condition may include links for retrieving the error condition information. Also, in one embodiment, the error condition information, or any portions thereof, may be stored in a searchable information storage, for example that may be organized and searched according to various attributes, including, but not limited to, a developer name or identifier, a program name or identifier, a program instance identifier, time, date, location, user (e.g., game player) names or identifiers, and many other attributes. Also, in one embodiment, the detected error condition itself may be provided with an identifier that may be used to search for information associated therewith, and this identifier may be provided to the developer, for example the notification at operation 720. Furthermore, in one embodiment, in addition to error condition information provided at operation 728, the developer may manually retrieve any desired data from the first program instance, for example by connecting to first program instance (and/or its replica) and/or an attached debugging server as described in detail above.

The above description refers to certain examples in which a developer may set various error conditions, for example via an interface such as shown in FIG. 2. It is noted however, that other techniques may also be employed for selection and detection of error conditions. For example, in one embodiment, one or more error conditions may be indicated using instructions that are included in program code associated with a hosted computer program. When a hosted program instance is executed, it may detect an occurrence of such an error condition based, at least in part, on the instructions that are included in the program code. The program instance may then report the occurrence of the error condition, for example to a debugging server or other monitoring components. In one embodiment, the occurrence of the error condition may be reported by the program instance using an application programming interface (API) call included in the program code. In one embodiment, the API call may be associated with an API exposed by the host service that executes the set of program instances on behalf of the developer. In one embodiment, the host service may allow the developer to set parameters for controlling the reporting of error conditions by program instances using any, or all, of the example techniques described above. For example, in some cases, the developers may provide instructions to enable reporting of error conditions by only a specified percentage of program instances, or by only a specified quantity of program instances. The host service may then enable and/or disable the reporting of occurrences of the error condition by one or more program instances within the program fleet, in some cases on an instance-by-instance basis. Also, in one embodiment, the developer may provide instructions to disable the reporting of error conditions by one or more program instances after a specified quantity of error conditions have been detected. The host service may then enable and/or disable the reporting of error conditions by one or more program instances based on any of the above or other instructions.

Figure 8:
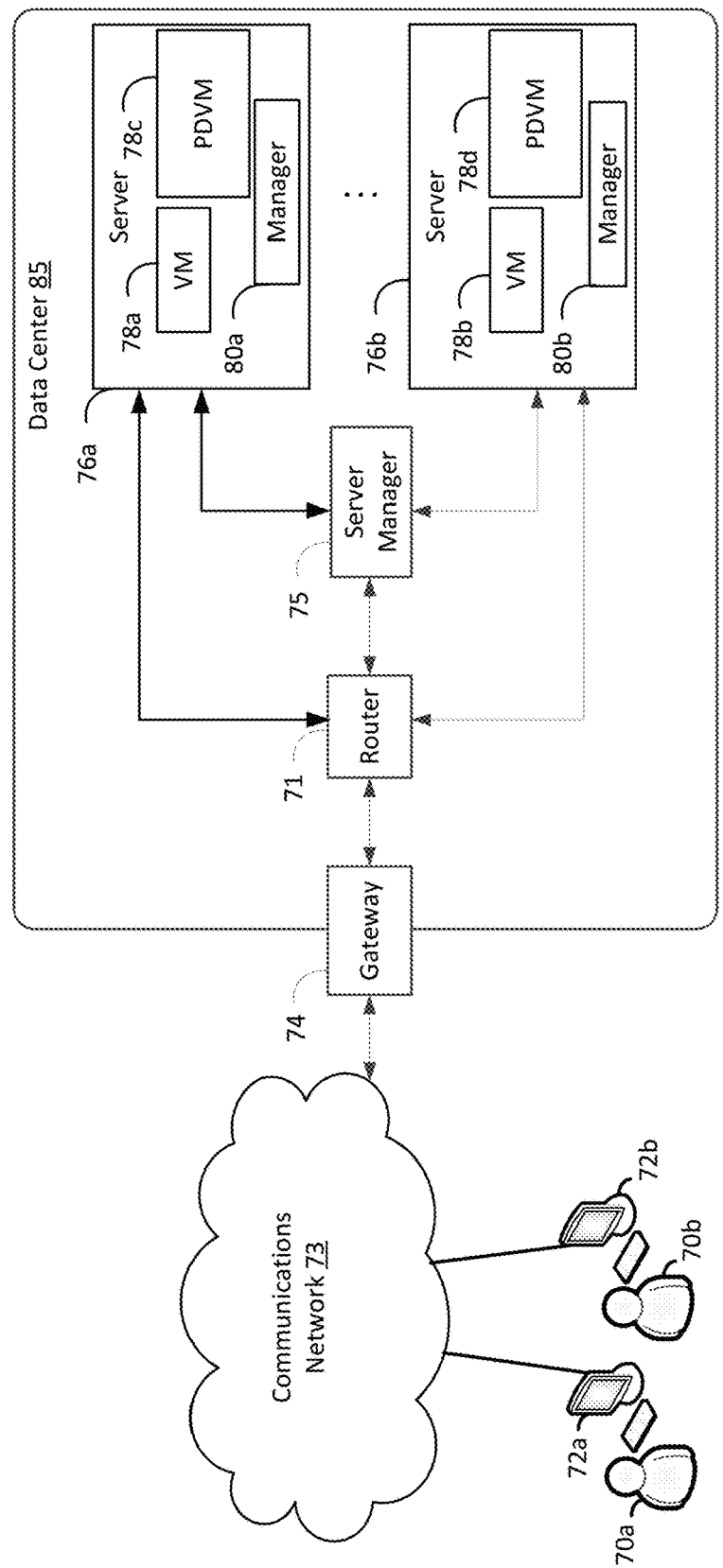
FIG. 8 is a diagram illustrating an example system for transmitting and providing data that may be used in accordance with the present disclosure.

An example system for transmitting and providing data will now be described in detail. In particular, FIG. 8 illustrates an example computing environment in which the embodiments described herein may be implemented. FIG. 8 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are program debugging virtual machine ("PDVM") instances. The PDVM virtual machine instances 78c and 78d may be configured to perform various aspects of the program debugging techniques and/or any other of the disclosed techniques in accordance with the present disclosure and described in detail above. As should be appreciated, while the particular example illustrated in FIG. 8 includes one PDVM virtual machine in each server, this is merely an example. A server may include more than one PDVM virtual machine or may not include any PDVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76a and 76b. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 9:
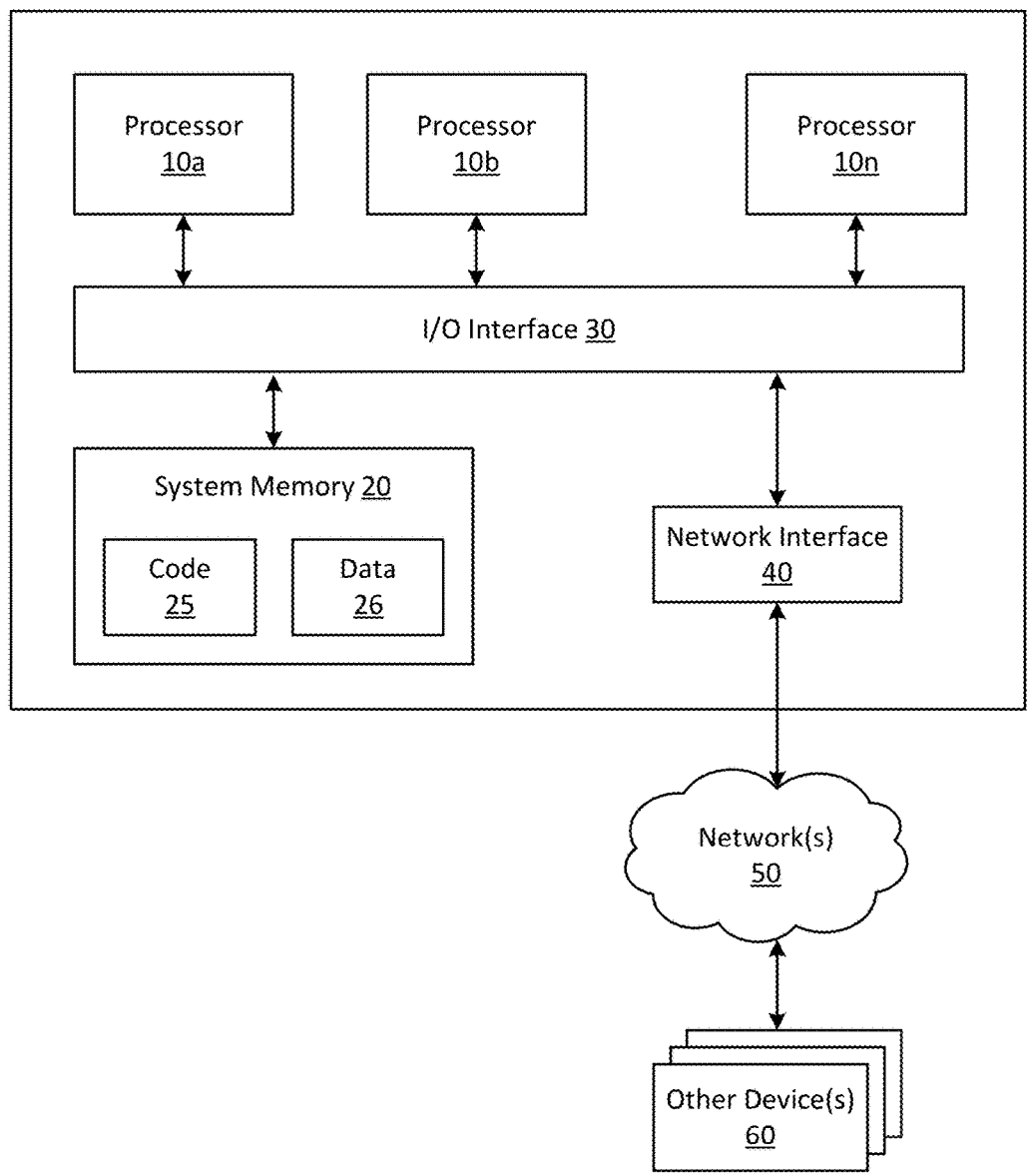
FIG. 9 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
one or more processors; and
one or more memories having stored therein instructions that, upon execution, cause the system to perform operations comprising:
receiving a first indication of an error condition for which to monitor a hosted interactive program, wherein the error condition comprises at least one of a breakpoint, a processing condition, a memory condition, or a network packet condition, and wherein the hosted interactive program has a set of program instances whose execution is hosted by a service;
receiving a second indication of an amount program instances to monitor for the error condition and of a quantity of occurrences of the error condition to detect;
selecting, based at least in part on the second indication, a subset of program instances from the set of program instances to monitor for the error condition;
monitoring the subset of program instances for the error condition up until the quantity of occurrences of the error condition are detected, wherein a count of detected error condition occurrences is maintained;
detecting an occurrence of the error condition in association with a first program instance of the subset of program instances;
providing a notification of the occurrence of the error condition;
providing information for connecting to the first program instance for debugging of the first program instance; and
providing information associated with the occurrence of the error condition, wherein the information comprises at least one of memory dump information, performance log information, network packet information, or custom administrative information.

2. The system of claim 1, wherein the second indication comprises at least one of a percentage of the set of program instances or a quantity of program instances to monitor for the error condition.

3. The system of claim 1, wherein the operations further comprise:
generating a replica program instance that is a replica of the first program instance; and
re-assigning one or more users of the first program instance from the first program instance to the replica program instance.

4. The system of claim 1, wherein the operations further comprise isolating the first program instance.

5. A method comprising:
receiving a first indication of an error condition for which to monitor a hosted interactive program, wherein the hosted interactive program has a set of program instances whose execution is hosted by a service;
receiving a second indication of an amount program instances to monitor for the error condition and of a quantity of occurrences of the error condition to detect;
selecting, based at least in part on the second indication, a subset of program instances from the set of program instances to monitor for the error condition;
monitoring the subset of program instances for the error condition up until the quantity of occurrences of the error condition are detected, wherein a count of detected error condition occurrences is maintained;
detecting an occurrence of the error condition in association with a first program instance of the subset of program instances;
providing a notification of the occurrence of the error condition;
providing information for connecting to at least one of the first program instance or a replica program instance that is a replica of the first program instance; and
providing information associated with the occurrence of the error condition.

6. The method of claim 5, wherein the error condition comprises at least one of a breakpoint, a processing condition, a memory condition, or a network packet condition.

7. The method of claim 5, wherein the second indication comprises at least one of a percentage of the set of program instances or a quantity of program instances to monitor for the error condition.

8. The method of claim 5, wherein the information associated with the occurrence of the error condition comprises at least one of memory dump information, performance log information, network packet information, or custom administrative information.

9. The method of claim 5, further comprising:
generating the replica program instance; and
re-assigning one or more users of the first program instance from the first program instance to the replica program instance.

10. The method of claim 5, further comprising:
generating the replica program instance, wherein information for connecting to the replica program instance is provided for debugging of the replica program instance.

11. The method of claim 5, further comprising performing, at the first program instance, administrative instructions for responding to the error condition.

12. The method of claim 5, further comprising attaching a debugging computer to each of the subset of program instances.

13. The method of claim 5, further comprising setting breakpoints on each of the subset of program instances.

14. The method of claim 5, wherein the hosted interactive program is a video game.

15. The method of claim 5, wherein the occurrence of the error condition is detected by the first program instance based, at least in part, on instructions included in program code associated with the hosted interactive program.

16. The method of claim 15, wherein the occurrence of the error condition is reported by the first program instance using an application programming interface (API) call included in the program code, the API call associated with an API exposed by the service that executes the set of program instances.

17. The method of claim 15, wherein the service that executes the set of program instances performs at least one of enabling or disabling reporting of occurrences of the error condition by one or more program instances.

18. A non-transitory computer-readable storage medium having stored thereon a set of instructions, which if performed by a machine, causes the machine to perform a method comprising:
receiving a first indication of an error condition for which to monitor a hosted computer program, wherein the hosted computer program has a set of program instances whose execution is hosted by a service;
receiving a second indication of an amount program instances to monitor for the error condition and of a quantity of occurrences of the error condition to detect;

selecting, based at least in part on the second indication, a subset of program instances from the set of program instances to monitor for the error condition;

monitoring the subset of program instances for the error condition up until the quantity of occurrences of the error condition are detected, wherein a count of detected error condition occurrences is maintained;

detecting an occurrence of the error condition in association with a first program instance of the subset of program instances;

providing a notification of the occurrence of the error condition;

providing information for connecting to at least one of the first program instance or a replica program instance that is a replica of the first program instance; and providing information associated with the occurrence of the error condition.

19. The non-transitory computer-readable storage medium of claim 18, wherein the error condition comprises at least one of a breakpoint, a processing condition, a memory condition, or a network packet condition.

20. The non-transitory computer-readable storage medium of claim 18, wherein the information associated with the occurrence of the error condition comprises at least one of memory dump information, performance log information, network packet information, or custom administrative information.

\* \* \* \* \*